(12) United States Patent
Hussain et al.

(10) Patent No.: US 6,463,809 B2
(45) Date of Patent: Oct. 15, 2002

(54) MASS FLOW METER

(76) Inventors: Yousif Hussain, 25 Thornburn Rd., Weston Favell, Northampton, NN3 3DA (GB); Chris N. Rolph, 2 Lodge Cottages, Salcey Lawn, Hartwell, Northampton (GB)

( * ) Notice: Subject to any disclaimer, the term of this patent is extended or adjusted under 35 U.S.C. 154(b) by 0 days.

(21) Appl. No.: 09/828,570

(22) Filed: Jul. 10, 2001

(65) Prior Publication Data

US 2002/0020227 A1 Feb. 21, 2002

(30) Foreign Application Priority Data

Apr. 12, 2000 (DE) .......................................... 100 17 963

(51) Int. Cl.[7] ................................................. G01F 1/84
(52) U.S. Cl. ................................................. 73/861.357
(58) Field of Search ...................... 73/861.354, 861.355, 73/861.356, 861.357, 861.75, 861.78, 861.79

(56) References Cited

U.S. PATENT DOCUMENTS

| | | | | |
|---|---|---|---|---|
| 4,876,898 A | * | 10/1989 | Cage et al. | ............... 73/861.38 |
| 5,728,951 A | * | 3/1998 | Van Cleve et al. | ..... 73/861.354 |
| 6,041,665 A | * | 3/2000 | Hussain | ................. 73/861.357 |
| 6,330,832 B1 | * | 12/2001 | Normen et al. | ........ 73/861.357 |

* cited by examiner

*Primary Examiner*—Benjamin R. Fuller
*Assistant Examiner*—Jewel V. Thompson

(57) ABSTRACT

A mass flowmeter for measuring the flow of fluids, operating by the Coriolis principle and designed for mounting on a fluid-carrying, preferably straight pipe, with at least one detector capable of measuring Coriolis forces and/or Coriolis-force-induced oscillations of the pipe, and with a bridge. The detector is attached to the bridge and the bridge is mountable on the pipe. The mass flowmeter is compact and can be mounted on existing pipes of a conduit system due to a design that permits radial attachment of the bridge on the pipe.

16 Claims, 3 Drawing Sheets

MASS FLOW METER

This invention relates to a mass flowmeter for moving fluids, designed to operate by the Coriolis principle and to be mounted on a fluid-conducting, preferably straight pipe, with at least one detector capable of detecting and measuring Coriolis forces and/or pipe oscillations induced by Coriolis forces, and with a bridge to which the detector is attached and which can be mounted on the conduit.

Conventional Coriolis-type mass flowmeters for measuring the flow of fluids typically incorporate as an additional component at least one bridge-mounted oscillator for oscillating the pipe, and have so far been available only as self-contained devices with a dedicated Coriolis pipe. Equipped with flanges at both ends of its Coriolis pipe, a mass flowmeter of that design can be installed in a fluid-carrying conduit system, for which purpose a section of the pipe corresponding to the length of the mass-flowmeter Coriolis pipe is removed and the mass flowmeter is installed in its place, i.e. a piece of the fluid-carrying pipe must be cut out and mounting flanges matching the flanges of the mass flowmeter must be welded to the open ends of the pipe.

If the plant in which the conduit system is integrated is already in operation, the installation of the mass flowmeter either necessitates an interruption of the production process of the plant or a bypass line must be provided. Installing a conventional Coriolis-type mass flowmeter for measuring the flow of fluids thus involves either a relatively labor-intensive integration of the mass flowmeter and/or generally an interruption of the production process of the plant whose conduit system is to be equipped with the mass flowmeter.

To avoid these problems, the German patent DE 44 17 332 C2 discusses the possibility of mounting both the oscillator and the detector on an existing pipe section of a conduit system.

That, however, leads to another problem in that the oscillator and the detector must brace themselves against an abutment so as to be able to oscillate the pipe and, respectively, to detect Coriolis forces and/or Coriolis-force-generated oscillations. To install such abutments for instance in complex chemical plants is nearly impossible or very expensive at best. Another problem associated with the required abutment consists in the fact that in conventional mass flowmeters for moving fluids incorporating a housing, connecting flanges and one Coriolis pipe conducting the fluid, the oscillator and detector use the housing as the abutment, causing the housing to oscillate around its quiescent point of equilibrium. As a result, part of the oscillating energy generated by the oscillator is lost while at the same time oscillations of the connecting pipes can produce false measurements.

To avoid the problems associated with the abutment, it has been proposed (ref. DE 44 17 332 C2) to connect the oscillator and preferably the detector as well not only and exclusively to the pipe of the conduit system, but also to a counter block dedicated to the oscillator and perhaps one dedicated to the detector, whereby the oscillator should be able to energize the pipe in the horizontal plane. This, however, no longer allows for a compact mass flowmeter when the oscillator or oscillators and the detector are designed as mutually separate units, each with its own counter block. Moreover, mounting that type of mass flowmeter on an existing pipe is problematic in terms of the precise positioning of the individual units especially with respect to the distance between the oscillator(s) and the detector or the distance between two detectors. Yet when two detectors are employed, their precise symmetrical alignment relative to the oscillator and their mutual distance are critical for accurate measurements.

Accordingly, it is the objective of this invention to provide a mass flowmeter for moving fluids, operating by the Coriolis principle, that is at once mountable on an existing conduit and compact in design.

The fluid-measuring Coriolis-type mass flowmeter according to this invention, solving the problems described above, is characterized by the fact that the mounting bridge can be attached to the pipe in radial fashion. In contrast to conventional mass flowmeters which are self-contained units, this design provides for a bridge which is laterally open over its entire length, thus allowing the mass flowmeter equipped with this bridge to be mounted on the existing pipe of a conduit system in radial fashion, i.e. from the side, from the top or from the bottom. Since the bridge is not a cross-sectionally closed body, it does not have to be mounted on the pipe in the longitudinal direction—an impossibility in the case of the pipe of an existing conduit system—but can be attached to the pipe, for instance, from the side.

The oscillatory excitation of the pipe may be produced by oscillations already existing in the conduit system of which the pipe, supporting the mass flowmeter according to this invention, is an integral part. Such oscillations are caused, for instance, by pumps or other equipment which are either integrated in the conduit system or are at least mechanically connected to it. However, for obtaining highly reproducible oscillatory excitation of the pipe, and especially an excitation producing a pipe resonance frequency, a preferred, enhanced design according to this invention provides for at least one oscillator by means of which the pipe can be oscillated and which is mounted on the bridge. In contrast to the prior-art Coriolis-type mass flowmeter for moving fluids as discussed further above, designed to-be mountable on an existing pipe of a conduit system, the detector and one oscillator of the mass flowmeter according to this invention are attached to the bridge. Accordingly, the mass flowmeter can be designed as a compact, single-unit device, with no positioning problems encountered when the mass flowmeter is mounted on the pipe.

The bridge of the mass flowmeter according to this invention can be mounted on the pipe in different ways. Since the bridge constitutes the abutment for the detector and, respectively, the oscillator, a preferred embodiment of this invention provides for an oscillatory excitation with a maximum attainable amplitude and optimal pipe flexibility by equipping the longitudinal ends of the bridge with mounting provisions by means of which the bridge can be attached to the pipe. In this fashion, the points at which the bridge can be attached to the pipe are located at a maximum distance from one another, leaving for the excitation oscillations or Coriolis oscillation of the pipe a pipe section which essentially corresponds to the entire length of the bridge. The longer the excitable and thus oscillation-capable pipe section, the more easily an excitation oscillation can be generated and maintained.

The mounting provisions at the longitudinal ends of the bridge can include various types of fasteners such as bolts or screws by means of which the bridge is attached to the pipe. According to a preferred, enhanced design version of this invention the mounting provisions are located in an area of the bridge that extends perpendicular to the longitudinal axis of the pipe. The mounting provisions are thus an integral part of the bridge which results in a compact configuration of the bridge and the mounting provisions while at the same time allowing for an optimum in sturdiness and power transfer.

The bridge can be of an essentially arbitrary cross-sectional design, be it U-shaped, V-shaped or curved or bent in any suitable manner. However, since the pipes to which the bridge of the mass flowmeter of this invention is to be attached usually have a circular cross section, a preferred embodiment of this invention provides for the bridge to have a circularly concave cross section. It is thus possible, by adapting the radius of the bridge to the radius of the pipe, to produce a mass flowmeter with the smallest possible outer dimensions.

The bridge can be fastened to the pipe for instance by welding. However, since at a later point in time it may be desirable under certain circumstances to use the mass flowmeter of this invention at another location within the conduit system or perhaps in an altogether different plant, one preferred embodiment of the invention provides for the bridge to be attached to the pipe in removable fashion. As an example, the bridge may be clamped onto the pipe. While a variety of clamping methods are possible, particular preference is given to the use of clips for clamping the bridge onto the pipe. Clips of that type embrace the area of the pipe that is not enclosed by the bridge and may be tightened to a point where by friction alone they securely hold the bridge on the pipe.

The Coriolis-type mass flowmeter for measuring moving fluids may be operated with only a bridge as described above, incorporating at least one detector and, where appropriate, one oscillator. At this juncture, it should be mentioned that, as a matter of course, the evaluation of the measuring data and the activation of any given oscillator require appropriate electronics, as do conventional mass flowmeters which are integrated into a conduit system via flange mounts.

For various considerations it may also be desirable to provide a counter block that can be attached to the bridge. For example, it may be possible to use this counter block for clamping the bridge onto the pipe. The counter block is preferably screwed to the bridge, but other fastening options are possible as well. Particular preference is given to a counter block with a circularly concave cross section so that, together with a bridge which itself has a circularly concave cross section, a housing is created which as a whole has a circularly concave cross section.

As a design feature of another. preferred implementation of this invention, independent of the cross-sectional shape of the bridge or the counter block, the mass flowmeter when installed on the pipe, along with the counter block attached to the bridge, completely wraps around the pipe in its radial direction over the full length of the bridge. This shields the detector and the oscillator from radial access along the pipe and thus against accidental intervention or interference from the side, top or bottom.

Preferably, as an alternative or in addition to this, the longitudinal ends of the bridge and the counter block feature front or end plates with cutouts to fit the pipe so that, when the mass flowmeter is mounted on the pipe, these front and end plates completely cover the space between the pipe and the bridge and counter block assembly. In combination with the above described, complete radial envelopment of the pipe by the bridge and the counter block, this will make the inner space of the mass flowmeter assembly, i.e. the area enclosed by the bridge and the counter block, altogether inaccessible from the outside without dismantling the counter block and/or the bridge from the pipe. This further enhances the aforementioned protection of the detector and the oscillator against extraneous interference.

For mounting the bridge on the pipe, the detector and/or oscillator can usually be left attached to the bridge. Depending on the location of the detector and/or oscillator,. however, it may be desirable when mounting the bridge on the pipe to have the option of detaching the detector and/or oscillator from the bridge. This leaves the possibility of installing the detector and/or oscillator on the far side of the pipe opposite the bridge.

The detector and/or oscillator may be directly attached to the bridge, i.e. mounted on its inner wall. In a preferred embodiment of this invention, however, the side of the bridge facing the pipe is provided with a support plate, the support plate is fastened to the bridge, and the oscillator and/or detector are mounted on the support plate. This represents an indirect attachment of the detector and/or oscillator to the bridge. The advantage of this configuration is that, in simple fashion, the distance between the support plate and the inner wall of the bridge can be varied as a function of the radius of the pipe on which the mass flowmeter is to be mounted, thus always allowing for an optimal positioning of the detector and/or oscillator relative to the pipe.

There are numerous specific ways in which the Coriolis-type fluid-flow-measuring mass flowmeter of this invention can be designed and configured. In that context, reference is made to the subclaims to patent claim 1 and to the following detailed description of preferred embodiments explained with the aid of the drawings, in which:

Figure 1:
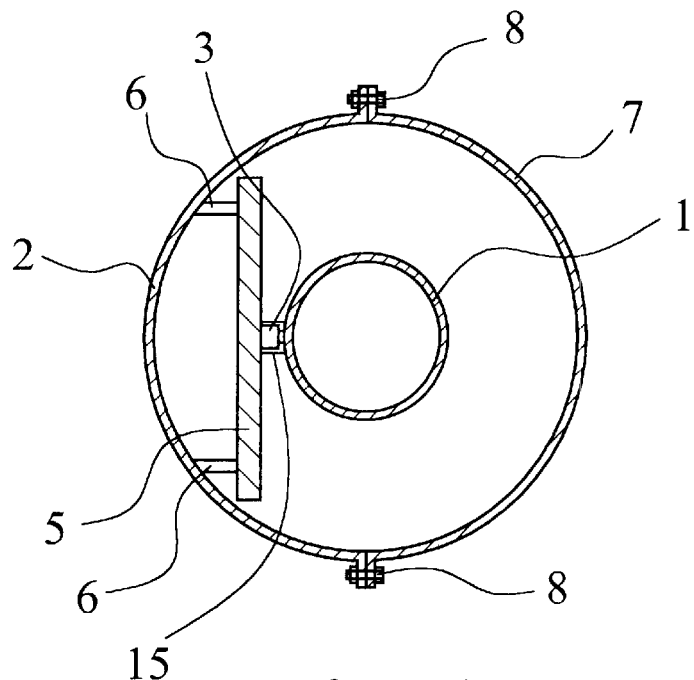
FIG. 1 is a sectional view of a mass flowmeter according to a first preferred embodiment of the invention.
Figure 2:
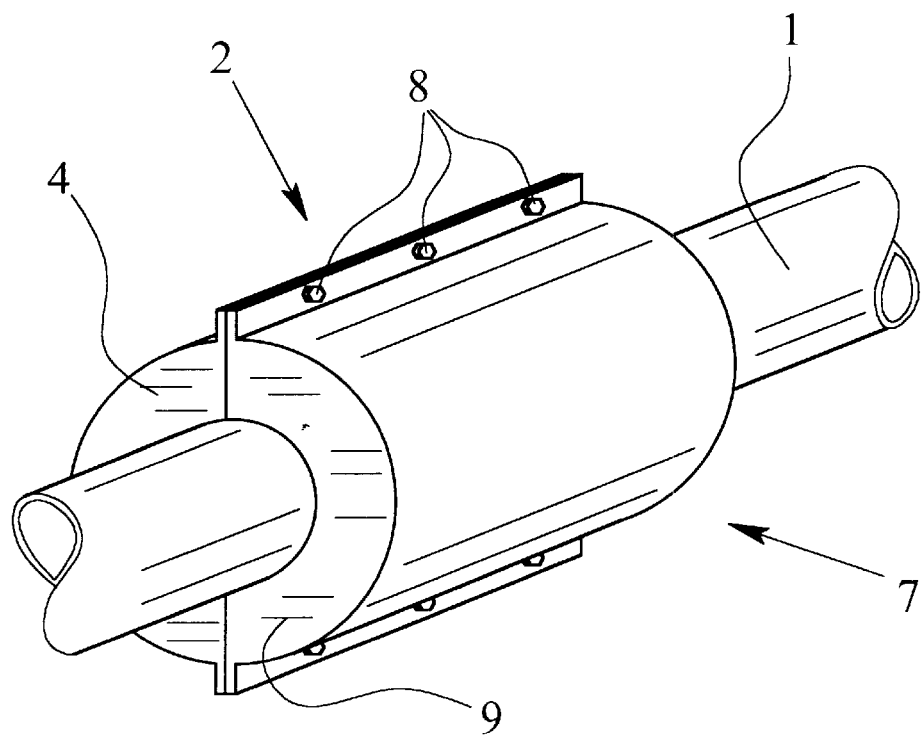
FIG. 2 is a perspective view of the mass flowmeter according to the first preferred embodiment of the invention.

FIGS. 1 and 2 are, respectively, sectional and perspective views of a mass flowmeter according to a first preferred embodiment of the invention, mounted on a straight pipe 1 carrying a moving fluid. The Coriolis. oscillations are captured by two detectors, not illustrated in detail, mounted at a distance from each other in the longitudinal direction of the pipe 1. The outer limit of the mass flowmeter is in the form of a bridge 2 within which both detectors as well as an oscillator 3 are located. The bridge 2 has an essentially semicircular cross section and is provided at its ends with sections 4 extending in a perpendicular direction relative to the longitudinal axis of the pipe 1. These perpendicular sections 4 each feature a semicircular cutout whose inner diameter precisely matches the outer diameter of the pipe 1 on which the mass flowmeter is mounted. In this fashion, the sections 4 of the bridge 2 serve as mounting provisions for attaching the bridge 2 to the pipe 1.

The detector and the oscillator 3 are attached to the bridge 2 via a support plate 5 which on its part is fastened to the inside of the bridge 2 by way of legs 6. This represents an indirect attachment of the detector and of the oscillator 3 to the bridge 2 with the aid of the support plate 5. Also attached to the bridge 2 is a counter block 7 which is of essentially the same shape as the bridge 2. The counter block 7 is attached to the bridge 2 by means of screws 8 which serve to firmly connect the bridge 2 and the counter block 7 over matching areas extending radially relative to the pipe 1. These screws provide a secure yet removable connection of the counter block 7 with the bridge 2. The bridge 2 and the counter block thus fully envelop the pipe 1, constituting a housing with a circular cross section radially surrounding the pipe 1 and consequently preventing access to, and interference with, the detector and the oscillator 3 from a radial direction of the pipe 1. Moreover, the counter block 7 permits the clamping of the bridge 2 onto the pipe 1 by virtue of the fact that the sections 4 of the bridge 2 which extend in a direction perpendicular to the longitudinal axis of the pipe 1 are provided with the aforementioned cutouts which precisely match the outer diameter of the pipe 1, and that, corresponding to the perpendicular sections 4 of the bridge 2, the counter block is provided with matching sections 9 so that, when the bridge 2 and the counter block 7 are screwed together, they are tightly pressure-clamped onto the pipe 1.

Figure 3:
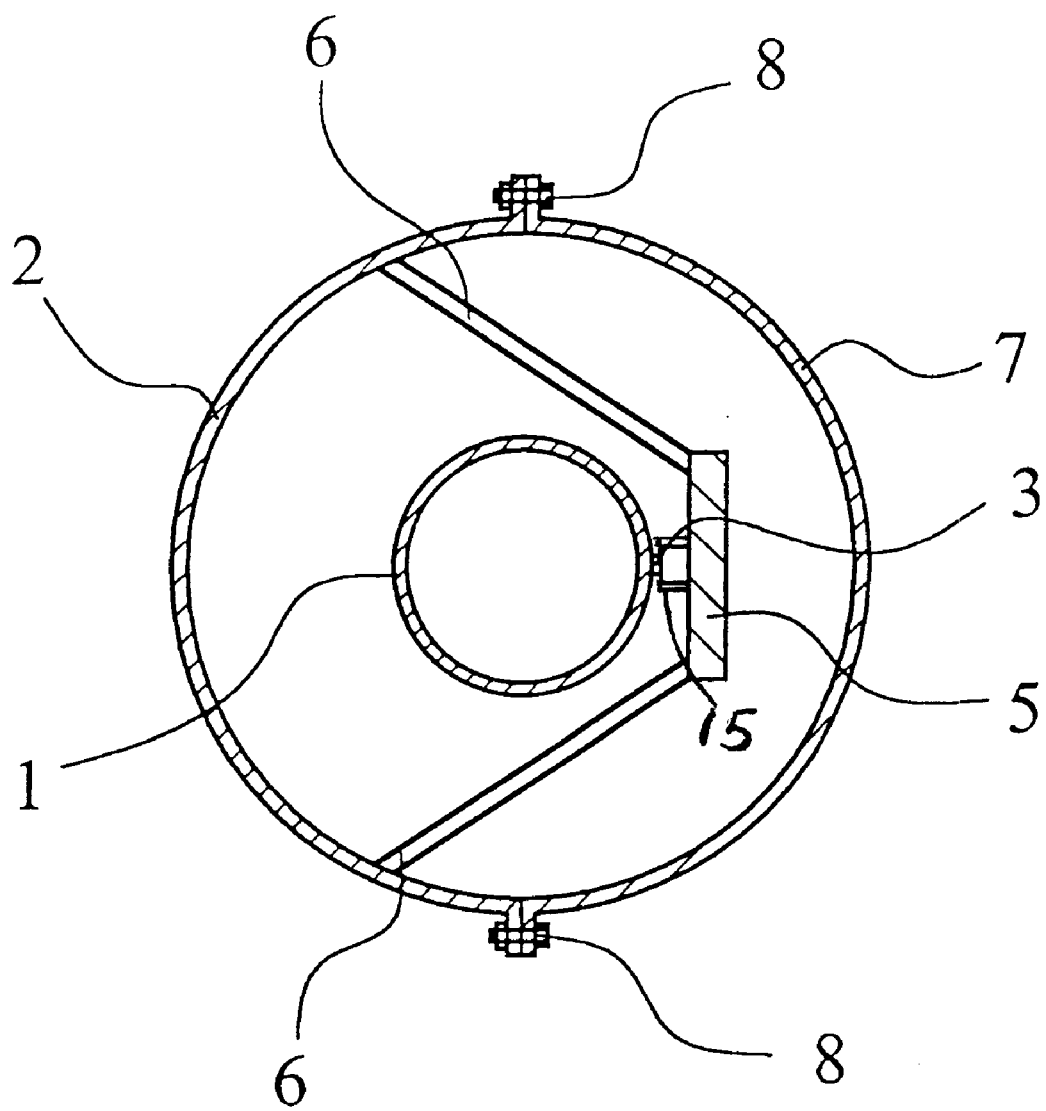
FIG. 3 is a sectional view of a mass flowmeter according to a second preferred embodiment of the invention.

FIG. 3 shows a mass flowmeter according to a second preferred embodiment of the invention, in which the support plate 5 is located on the far side of the pipe 1 opposite the bridge 2. In all other respects, the mass flowmeter according to the second preferred embodiment -is essentially identical to the mass flowmeter of FIGS. 1 and 2. However, a prerequisite for the positioning of the support plate 5 as shown in FIG. 3 is that for mounting the bridge 2 on the pipe 1, the support plate 5 with detector and oscillator must be detachable. The same applies in the event that the detector and/or the oscillator 3 is to be mounted on the far side of the pipe 1 opposite the bridge 2 without the intermediary of a support plate 5. In that case, the detector and/or the oscillator 3 must again be detachable from the bridge 2 for mounting the bridge 2 on the pipe 1.

Figure 4:
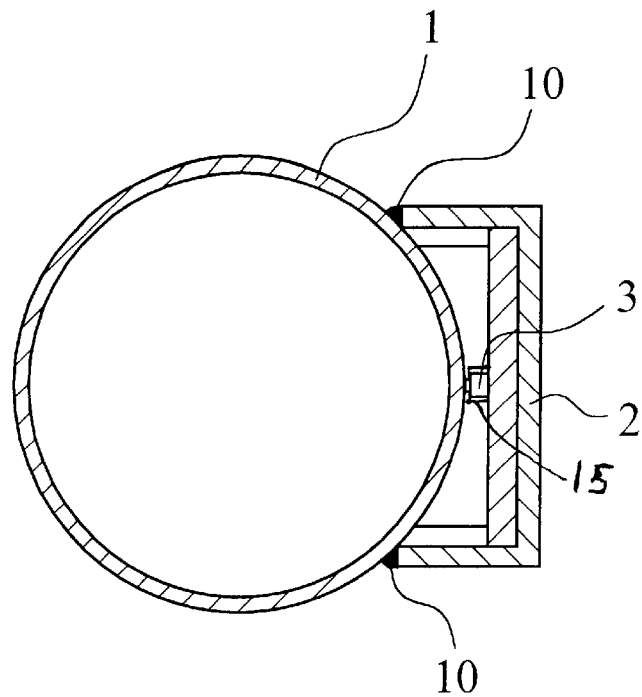
FIG. 4 is a sectional view of a mass flowmeter according to a third preferred embodiment of the invention.
Figure 5:
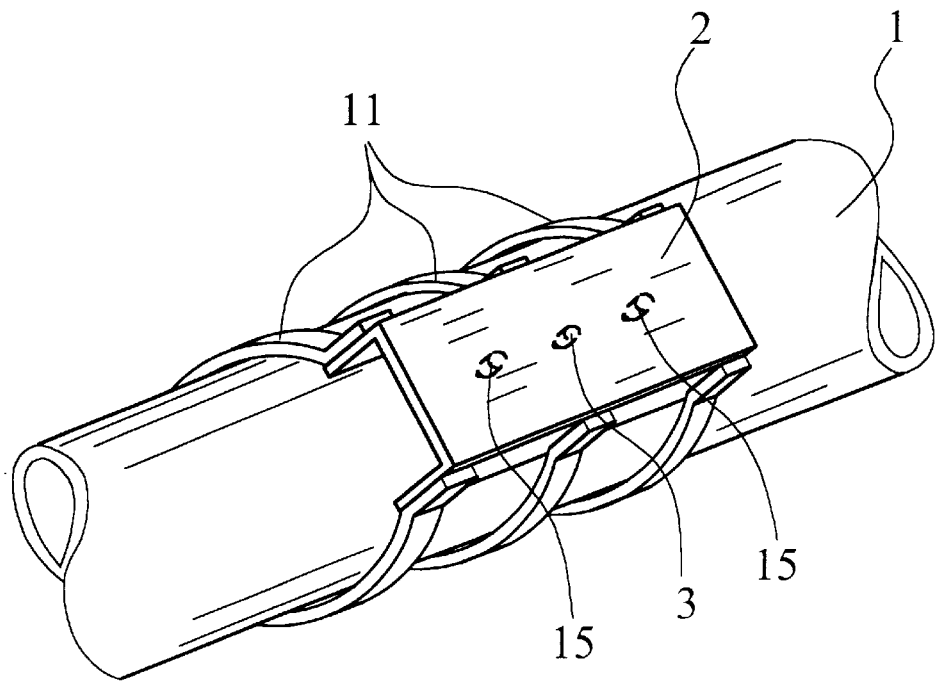
FIG. 5 is a perspective view of the mass flowmeter according to the third preferred embodiment of the invention.

Finally, FIGS. 4 and 5 are, respectively, sectional and perspective views of a mass flowmeter according to a third preferred embodiment of the invention. As is evident from FIG. 4, the mass flowmeter according to the third preferred embodiment of the invention can be mounted on a pipe 1 that has a very large diameter. In this case, the bridge 2 of the mass flowmeter does not wrap around the entire diameter of the pipe 1 but extends over only a lateral section of the pipe 1. It follows that the mass flowmeter according to the third preferred embodiment of the invention is not equipped with a counter block as described with reference to FIGS. 1 to 3.

Instead, the bridge 2 can be attached to the pipe 1 in other ways, for instance by welding the bridge 2 to the pipe 1. FIG. 4 shows how the bridge 2 may be attached to the pipe 1 via lateral weldments 10. This, of course, makes it essentially impossible to detach the bridge 2 for use elsewhere. Therefore, FIG. 5 illustrates a typical approach for a mass flowmeter according to the third preferred embodiment of the invention whereby the bridge 2 is pressure-clamped onto the pipe 1 by means of clips 11. Especially when the ends of the bridge 2 are open, i.e. when no adaptation of the end sections to the curvature of a given pipe 1 is involved, the mass flowmeter according to the third preferred embodiment of the invention is universally employable if resilient clips 11 are used which adapt to different pipe diameters.

In conclusion, it should be pointed out that, wherever there is mention of one detector or the detector, it is of course possible to provide two detectors as is general practice.

What is claimed is:

1. A Coriolis mass flowmeter having longitudinal ends for measuring moving fluids, for mounting on a fluid-conducting, substantially straight pipe having a longitudinal axis, with at least one detector capable of measuring Coriolis forces and/or Coriolis-force-engendered oscillations of the pipe, and with a bridge, where the said detector is attached to the bridge wherein said bridge is laterally open along its entire length, allowing mounting of said bridge on said pipe in a direction perpendicular to said axis.

2. The mass flowmeter as in claim 1, and further including at least one oscillator capable of causing the pipe to oscillate, and means for attaching the oscillator to the bridge.

3. The mass flowmeter as in claim 1 or 2, wherein at said longitudinal ends, the bridge has mounting provisions by means of which the bridge is engaged to the pipe.

4. The mass flowmeter as in claim 3, wherein said mounting provisions are in the form of sections of the bridge which extend in a direction perpendicular to said axis.

5. The mass flowmeter as in claim 1 or 2, wherein the bridge has a cross section corresponding to a sector of a circle.

6. The mass flowmeter as in claim 1 or 2, wherein on its side facing the pipe, the bridge is provided with a support plate, the support plate is attached to the bridge and the oscillator and/or the detector are/is mounted on the support plate.

7. The mass flowmeter as in claim 1 or 2, wherein the bridge is mounted on the pipe in detachable fashion.

8. The mass flowmeter as in claim 7, including clamping means for clamping the bridge onto the pipe.

9. The mass flowmeter as in claim 1 or 2, wherein a counter block is provided and is attached to the bridge.

10. The mass flowmeter as in claim 9, including clamping means for clamping the bridge onto the pipe with the aid of the counter block.

11. The mass flowmeter as in claim 1 or 2, including means for screwing the counter block to the bridge.

12. The mass flowmeter as in claim 9, wherein the counter block has a cross section corresponding to a sector of a circle.

13. The mass flowmeter as in claim 9, wherein, when the mass flowmeter is mounted on the pipe, the bridge and the counter block attached to the bridge completely wrap around the pipe in a radial direction over the entire length of the bridge.

14. The mass flowmeter as in claim 8, including clips for clipping the bridge onto the pipe.

15. The mass flowmeter as in claim 1 or 2, wherein for mounting the bridge on the pipe, the oscillator and/or the detector are/is detachable from the bridge.

16. A Coriolis mass flowmeter for sideways mounting to a substantially straight, fluid-conducting pipe having a longitudinal axis, said flowmeter comprising a bridge, said bridge having an open cross-section defining an opening in the bridge which extends the entire length of the bridge so that the bridge can be engaged around the pipe in a direction perpendicular to said axis;

at least one detector positioned on and attached to the bridge so that when the bridge in engaged around the pipe, the detector is able to measure Coriolis forces and/or Coriolis force-induced oscillations of said pipe, and securing means for securing the engage-around bridge to the pipe.

* * * * *